United States Patent

Senda et al.

(10) Patent No.: US 9,830,053 B2
(45) Date of Patent: Nov. 28, 2017

(54) SCREEN DEFINITION DEVICE FOR OPERATING PANEL

(71) Applicant: JTEKT Corporation, Osaka-shi (JP)

(72) Inventors: Terukazu Senda, Obu (JP); Kentaro Takasu, Nishio (JP)

(73) Assignee: JTEKT CORPORATION, Osaka-shi (JP)

( * ) Notice: Subject to any disclaimer, the term of this patent is extended or adjusted under 35 U.S.C. 154(b) by 440 days.

(21) Appl. No.: 14/222,789

(22) Filed: Mar. 24, 2014

(65) Prior Publication Data

US 2014/0298225 A1 Oct. 2, 2014

(30) Foreign Application Priority Data

Mar. 27, 2013 (JP) ................. 2013-066141

(51) Int. Cl.
*G06F 3/00* (2006.01)
*G06F 3/0484* (2013.01)
*G06F 3/041* (2006.01)
*G06F 9/44* (2006.01)
*G05B 19/05* (2006.01)

(52) U.S. Cl.
CPC ......... *G06F 3/0484* (2013.01); *G05B 19/056* (2013.01); *G06F 3/041* (2013.01); *G06F 8/38* (2013.01); *G06F 9/4443* (2013.01); *G05B 2219/13031* (2013.01)

(58) Field of Classification Search
CPC .... G06F 9/4443; G06F 1/3218; G06F 3/0412; G06F 3/1423; G06F 3/147
See application file for complete search history.

(56) References Cited

U.S. PATENT DOCUMENTS 5,675,752 A 10/1997 Scott et al.
7,822,673 B2 * 10/2010 Inamochi ............... G06Q 20/10
705/37

(Continued)

FOREIGN PATENT DOCUMENTS

JP 08-263244 A 10/1996
JP 9-292942 11/1997

(Continued)

OTHER PUBLICATIONS

Charlotte, "18 Absolutely Creative Interactive Kiosk Screen Layouts", http://www.onextrapixel.com/2009/04/23/18-absolutely-creative-interactive-kiosk-screen-layouts/, Apr. 2009.*

(Continued)

*Primary Examiner* — Jennifer To
*Assistant Examiner* — Joseph R Burwell
(74) *Attorney, Agent, or Firm* — Oblon, McClelland, Maier & Neustadt, L.L.P.

(57) ABSTRACT

A screen definition device includes a screen data generating unit that outputs screen data generated by combining model screen data in which section information is set, with screen definition tables for the model screen data; a screen data combining unit that combines the screen data with the other screen data based on a reference relation indicated by link information of the screen data and the link information of the other screen data; and a screen definition table setting unit that sets screen definition tables in a table form.

2 Claims, 9 Drawing Sheets

(56) References Cited

U.S. PATENT DOCUMENTS

| | | | | |
|---|---|---|---|---|
| RE45,882 E | * | 2/2016 | Woycik | G06Q 20/367 |
| 2001/0047302 A1 | * | 11/2001 | Yoshinaga | G06Q 10/087 |
| | | | | 705/15 |
| 2003/0122793 A1 | * | 7/2003 | Takasu | G05B 19/042 |
| | | | | 345/173 |
| 2007/0265935 A1 | * | 11/2007 | Woycik | G06Q 20/367 |
| | | | | 705/65 |
| 2013/0194628 A1 | * | 8/2013 | Kamimoto | G06F 3/1286 |
| | | | | 358/1.15 |

FOREIGN PATENT DOCUMENTS

| | | | |
|---|---|---|---|
| JP | 11015522 A | * | 1/1999 |
| JP | 11-212609 A | | 8/1999 |
| JP | 11212609 A | * | 8/1999 |
| JP | 2011-238151 A | | 11/2011 |
| JP | 2011238151 A | * | 11/2011 |

OTHER PUBLICATIONS

Extended European Search Report issued Nov. 5, 2014 in Patent Application No. 14161415.6.
Extended European Search Report dated Nov. 5, 2014 in Patent Application No. 14161415.6.

* cited by examiner

FIG. 4

| SWITCHING CONDITION | | SCREEN NAME | NAME |
|---|---|---|---|
| MENU_P1 | BUTTON 1 SWITCHING DESTINATION | KAKKO | INDIVIDUAL OPERATION |
| | BUTTON 2 SWITCHING DESTINATION | IJYO | ABNORMALITY DISPLAY |
| | BUTTON 3 SWITCHING DESTINATION | KOUGU | TOOL CHANGE |
| | BUTTON 4 SWITCHING DESTINATION | HOSEI | TOOL CORRECTION |

FIG. 5A

| SYMBOL | NAME | CHARACTER SIZE | LAMP COLOR | | ADDRESS | | SWITCH SCREEN NAME |
|---|---|---|---|---|---|---|---|
| | | | ON | OFF | LIGHTING | BLINKING | |
| LP01 | PC IN OPERATION | S | O | BL | 1M0 | 1V4 | IJYO |
| LP02 | ATMOSPHERIC PRESSURE | S | O | BL | 1M1 | 1V4 | IJYO |
| LP03 | COOLANT | S | O | BL | 1M2 | 1V4 | IJYO |
| LP04 | NC PREPARATION COMPLETED | S | O | BL | 1M3 | 1V4 | IJYO |

FIG. 5B

| SYMBOL | NAME | NO. OF LINES OF CHARACTERS | LAMP COLOR | | FRAME COLOR | |
|---|---|---|---|---|---|---|
| | | | ON | OFF | ON | OFF |
| BT1 | CARRYING-OUT FORWARD | 2 | W | BL | R | W |
| BT2 | CARRYING-OUT BACKWARD | 2 | W | BL | R | W |
| BT3 | CARRYING-OUT LIFT UPWARD | 2 | W | BL | R | W |
| BT4 | CLOSE DOOR | 2 | W | BL | R | W |

FIG. 5C

| SYMBOL | ADDRESS | | | | | |
|---|---|---|---|---|---|---|
| | LAMP BLINKING | LAMP LIGHTING | BUTTON OUTPUT | OPERATION CONDITION | STARTING CONDITION |
| BT1 | EL11 | EL111 | EX611 | EL211 | 1V5 |
| BT2 | EL12 | EL112 | EX612 | EL212 | 1V5 |
| BT3 | EL13 | EL113 | EX613 | EL213 | 1V5 |
| BT4 | EL14 | EL114 | EX614 | EL214 | 1V5 |

FIG. 8

| SYMBOL | NAME | CHARACTER SIZE | |
|---|---|---|---|
| TITLE1 | ID OPERATION | S | |
| TITLE2 | ID NUMBER (READ) | S | |
| TITLE3 | ID NUMBER (AUTOMATIC) | S | |
| TITLE4 | ID NUMBER (MANUAL) | S | |

| SYMBOL | NO. OF CHARACTERS | CHARACTER SIZE | ADDRESS | |
|---|---|---|---|---|
| ID1 | 16 | S | D100 | |
| ID2 | 16 | S | D200 | |

| SYMBOL | NAME | CHARACTER SIZE | LAMP COLOR | | |
|---|---|---|---|---|---|
| | | | ON | OFF | |
| BT1 | MANUAL | S | W | BL | |
| BT2 | AUTOMATIC | S | W | BL | |
| BT3 | CAMERA | S | W | BL | |

SCREEN DEFINITION DEVICE FOR OPERATING PANEL

INCORPORATION BY REFERENCE

The disclosure of Japanese Patent Application No. 2013-066141 filed on Mar. 27, 2013 including the specification, drawings and abstract is incorporated herein by reference in its entirety.

BACKGROUND OF THE INVENTION

1. Field of the Invention

The invention relates to a screen definition device for an operating panel.

2. Description of the Related Art

Conventionally, a programmable controller (hereinafter referred to as the PLC) has been widely used as a controller that controls equipment. The PLC is connected to a device such as an electromagnetic valve or an actuator, and an operating panel including a display. In the display of the operating panel, there is displayed a screen of a control panel, which is constituted by elements including lamps indicating an operating state of the controller and buttons for operating the controller. When a transparent touch panel disposed to overlap with the screen is touched, an operation corresponding to the screen can be performed.

The screen is displayed in accordance with screen data stored in a storage device in the operating panel, and figures showing the lamps, the buttons and the like are displayed via the screen data, to simulate the control panel. The screen is constituted by a plurality of screen parts, and one of the screen parts can be switched to the other screen corresponding to the operation by a screen switching button. The screen data includes elements such as the lamps and the like whose display states change in accordance with data from the PLC, and elements such as the buttons and the like that provide commands to the PLC in response to operations of the buttons and the like. In each of these elements, a name, a color, a PLC address and the like are defined as parameters. In addition, in the screen switching button, link information, which is information on link to switching destination screen data, is defined.

To create the screen data, a shape, a size, a color and the like of each of elements such as the lamps and the buttons to be displayed on the screen are defined, and figures showing the elements are drawn by using drawing software that is generally operated on a personal computer, and then a correspondence between each figure and the address of the PLC is defined. When the screen is defined by the drawing software, the degree of freedom is high in drawing, setting and the like, and various screens can be created. However, it is known that much time is required for mastering a drawing operation, an operation for setting the parameters for the elements, and the like. Thus, Japanese Patent Application Publication No. 9-292942 (JP 9-292942 A) describes a screen definition device for an operating panel, which includes a screen on which predetermined sections are set, and a screen definition table showing elements to be disposed in the respective sections in a table form. In the screen definition device, parameters for the elements are set in the table form. Therefore, the screen definition can be easily performed without mastering the operation for screen definition by using the drawing software.

The equipment is renovated or changed depending on situations, and a change of the screen of the operating panel may be required to cope with the renovation or the change of the equipment. However, in the above-mentioned screen definition device, it is possible to define a screen having a section configuration commonly used in the operating panel, that is, a standard screen constituted by a so-called model screen, but it is not possible to newly add, for example, definition of a screen for exclusive use in equipment, which is designed by an equipment user.

This is because the section configuration of the screen for exclusive use in the equipment (hereinafter referred to as the user screen) is different from the section configuration of the standard screen, and hence the same screen definition table as that for the standard screen cannot be applied. Another method is conceivable in which a model screen and a screen definition table are prepared for each of the standard screen and the user screen to separately define the screens, but in this method, information cannot be shared between the standard screen and the user screen, and hence an operation common to all the screens, for example, a screen switching operation cannot be set.

Thus, the user screen is defined by using the drawing software, and the user screen is combined with the standard screen by the screen definition device, but much time is required for mastering the operation for screen definition by using the drawing software. Therefore, a screen definition device for an operating panel has been demanded, in which the user screen is also easily defined in the table form, and the user screen can be added to the standard screen.

SUMMARY OF THE INVENTION

An object of the invention is to provide a screen definition device for an operating panel, in which screen data can be efficiently created by easily defining all screens in a table form.

According to a first aspect of the invention, there is provided a screen definition device for an operating panel, wherein the operating panel includes: screen data corresponding to a screen constituted by elements including a lamp indicating an operating state of a controller that controls equipment, and a button for operating the controller; a screen display unit in which the screen is displayed in a display in accordance with the screen data; and a transparent touch panel disposed to overlap with the display. When the touch panel is touched in the operating panel, an operation corresponding to the screen displayed in the display is performed, and the screen data includes section information indicating an arrangement of the elements constituting the screen, a screen definition table in which parameters for the elements constituting the screen are set, and link information that refers to the other screen data. The screen definition device includes: a screen data generating unit that outputs the screen data generated by combining model screen data in which the section information is set, with the screen definition table for the model screen data; a screen data combining unit that combines the screen data with the other screen data based on a reference relation indicated by the link information of the screen data and the link information of the other screen data; and a screen definition table setting unit that sets the screen definition table in a table form.

In the screen definition device for an operating panel with the above-mentioned configuration, a screen definition table setting unit corresponding to model screen data for a standard screen sets parameters for the elements in the table form. Thus, a screen definition table for the standard screen can be easily created in the screen definition device. Similarly, a screen definition table setting unit corresponding to model screen data for a user screen sets parameters for the elements in the table format, and thus, a screen definition table for the user screen can be easily created. Then, the screen data generating unit can output screen data for the standard screen generated by combining the model screen data for the standard screen with the screen definition table corresponding to the model screen data. Similarly, the screen data generating unit can output screen data for the user screen generated by combining the model screen data for the user screen with the screen definition table corresponding to the model screen. Further, the screen data combining unit can combine the screen data with the other screen data based on the reference relation indicated by the link information of the screen data and the link information of the other screen data. Thus, the screen data can be efficiently created by easily defining all the screens including the standard screen and the user screen in the table format. Further, the user screen defined by the screen definition device can be added to the existing standard screen.

The screen definition device for the operating panel according to the above-mentioned aspect may further include a screen definition table acquiring unit that acquires the screen definition table from the screen data.

In the screen definition device with the above-mentioned configuration, the screen definition table acquiring unit can acquire the corresponding screen definition table from the existing screen data. Thus, the screen definition table can be acquired, and the screen definition table setting unit can easily change the screen definition table. Then, the screen data generating unit can regenerate the screen data by combining the model screen data with the screen definition table. Thus, the screen data can be efficiently created by using the existing screen data.

According to the above-mentioned aspect, the screen data can be efficiently created by easily defining all the screens in the table form.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4 is an explanatory view showing a screen definition table for screen switching button elements commonly used in the standard screen;

FIG. 5A is an explanatory view showing a screen definition table for lamp elements of the individual operation screen, FIG. 5B is an explanatory view showing a screen definition table for button elements of the individual operation screen, and FIG. 5C is an explanatory view showing a screen definition table for PLC addresses in FIG. 5B;

FIG. 8 is an explanatory view showing a screen definition table for elements in the ID operation screen.

DETAILED DESCRIPTION OF EMBODIMENTS

Figure 1:
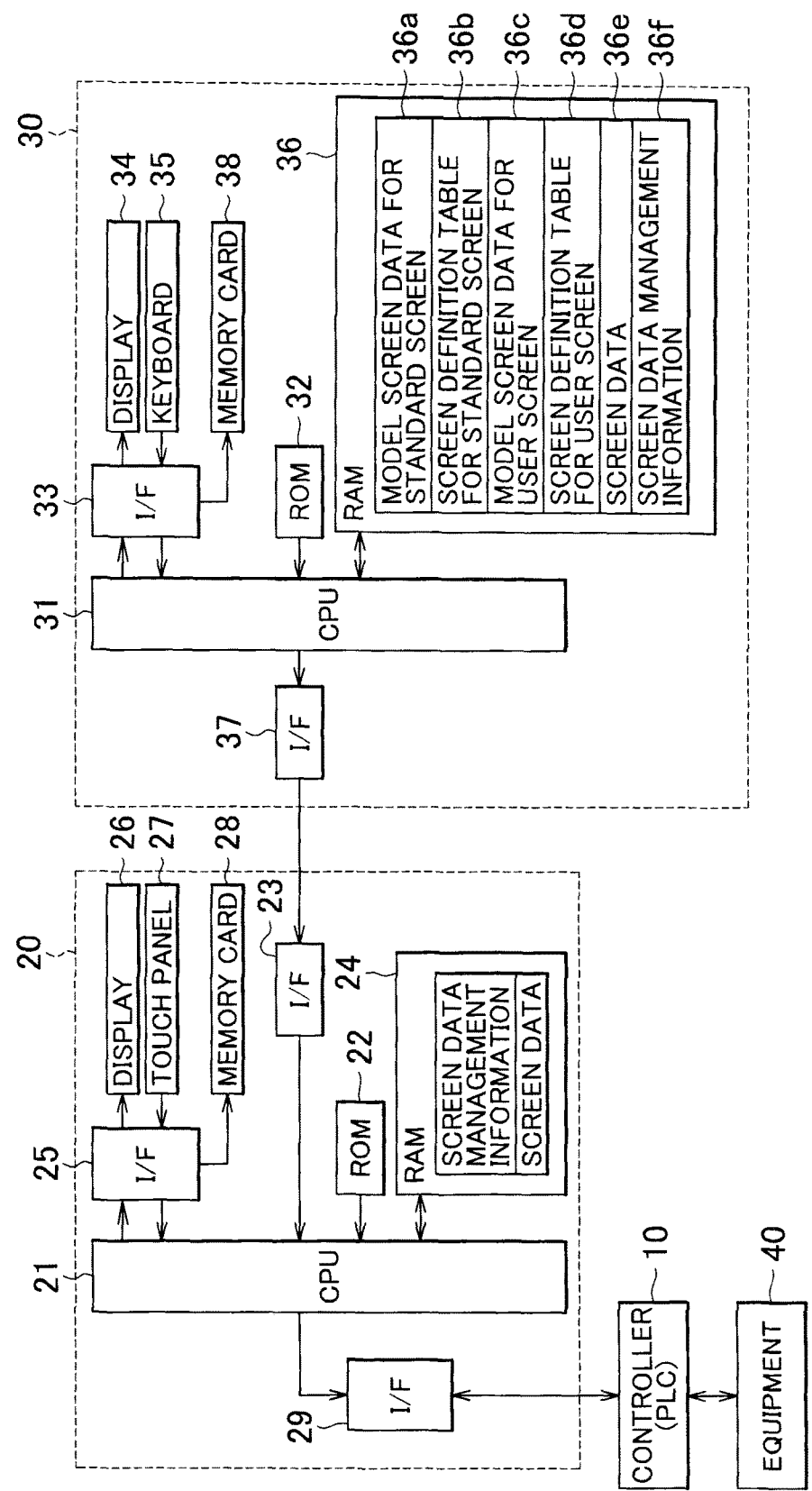
FIG. 1 is a schematic diagram showing a configuration of a screen definition device and an operating panel according to an embodiment of the invention.

Hereinafter, an embodiment of the present invention will be described with reference to the accompanying drawings. FIG. 1 is a schematic diagram showing a configuration of a screen definition device 30 for an operating panel that is mounted on a general-purpose personal computer (hereinafter referred to as the PC) by installing software of screen definition processing 100, and a configuration for an operating panel 20 in which a screen is displayed in a display 26 in accordance with screen data created by the screen definition device 30.

As shown in FIG. 1, the operating panel 20 includes a CPU 21 that executes control for the entire operating panel 20, a ROM 22 in which a processing program to be performed by the CPU 21 is stored, and a RAM 24 in which the screen data created by the screen definition device 30 is stored. Furthermore, the CPU 21 is connected to the display 26 and a transparent touch panel 27 disposed so as to overlap with the display 26, via an interface 25. Furthermore, the CPU 21 is connected to a memory card device 28 via the interface 25, and thus, the screen data created by the screen definition device 30 can be input into the RAM 24 via a memory card. The screen data can be transmitted and received through connection via an interface 23 of the operating panel 20 and an interface 37 of the screen definition device 30. The operating panel 20 is connected to a controller PLC 10 that controls equipment 40 via an interface 29.

The screen definition device 30 includes a CPU 31 that executes control for the entire screen definition device 30, a ROM 32 in which a processing program to be performed by the CPU 31 is stored, and a RAM 36. A display 34 and a keyboard 35 are connected to the CPU 31 via an interface 33. A memory card device 38 is connected to the CPU 31 via the interface 33, and thus, the screen data can be output to the memory card.

The RAM 36 includes an area 36a where model screen data for a standard screen is stored, an area 36b where a screen definition table corresponding to the model screen data is stored, an area 36c where model screen data for a user screen is stored, an area 36d where a screen definition table corresponding to the model screen data is stored, an area 36e where screen data created by the screen definition device 30 is stored, and an area 36f where screen data management information is stored.

The screen definition processing 100 executed by the screen definition device 30 having the above-mentioned configuration will be described with reference to a block diagram of FIG. 2.

Figure 2:
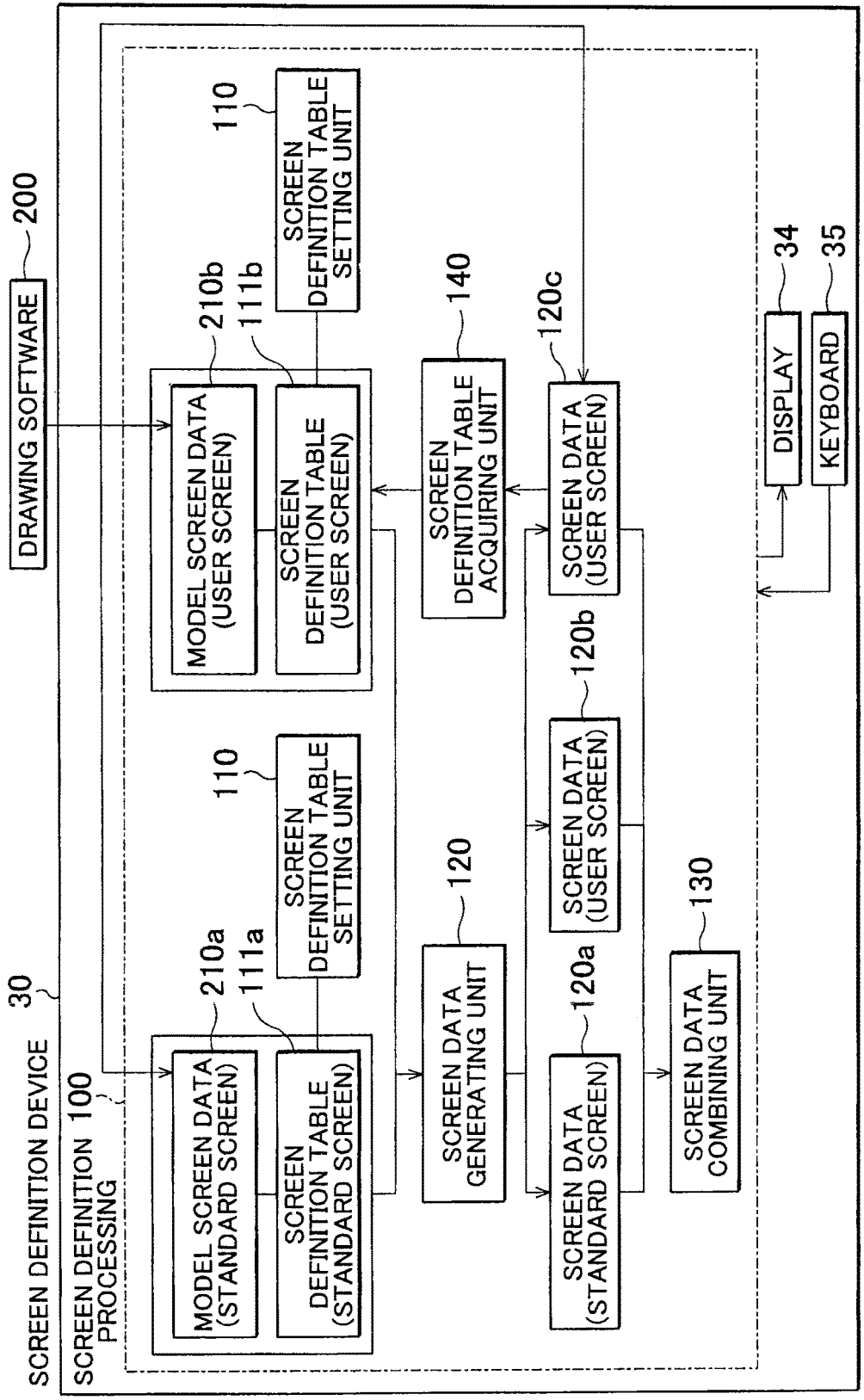
FIG. 2 is a block diagram showing screen definition processing in the screen definition device according to the embodiment of the invention.

As shown in FIG. 2, the screen definition processing 100 includes, as processing programs, a screen definition table setting unit 110, a screen data generating unit 120, and a screen data combining unit 130. Furthermore, the screen definition processing 100 includes model screen data 210a that becomes a model screen of a standard screen of the operating panel 20, model screen data 210b that becomes a model screen of a user screen, and screen definition tables 111a and 111b corresponding to the model screen data 210a and 210b, respectively. The model screen data 210a and 210b are screen data created in advance by drawing software 200.

When the screen definition processing 100 is started, the model screen data 210a for the standard screen stored in the area 36a of the RAM 36 of FIG. 1 is read.

Examples of the standard screen include an operation display screen in which lamps and the like indicating an operating state are defined, an individual operation screen in which buttons for individual operations are defined, and an abnormality display screen in which lamps and the like indicating abnormalities are defined. The screen definition device 30 includes the model screen data 210a for the standard screen, and the screen definition table 111a corresponding to the model screen data 210a.

Figure 3:
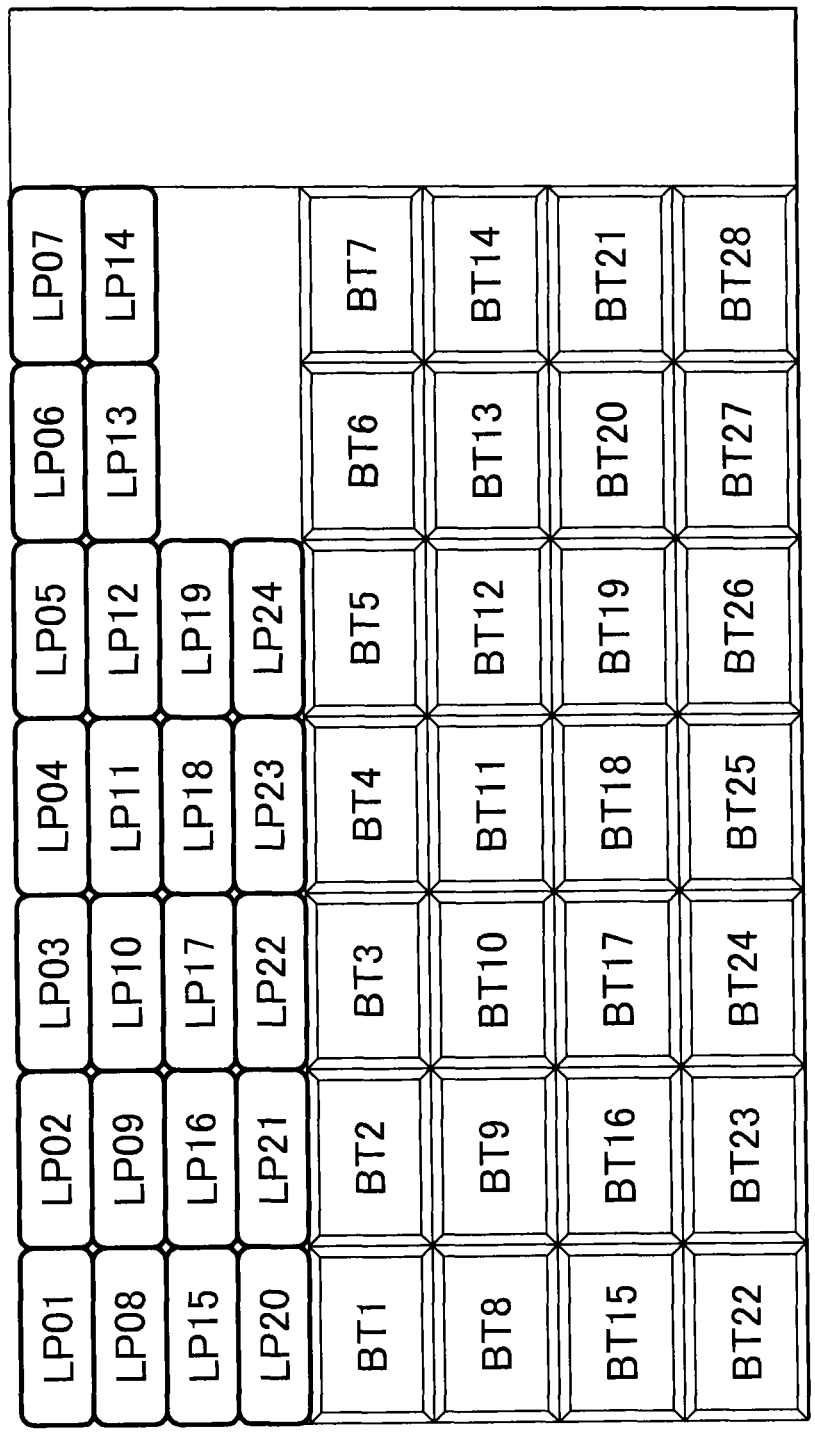
FIG. 3 is an explanatory view showing model screen data for an individual operation screen that is a standard screen.

As shown in FIG. 3, the model screen data 210a is image data that has section information indicating an arrangement of elements constituting the screen. FIG. 3 shows the model screen data for the individual operation screen that is the standard screen. The individual operation screen has a section configuration in which lamp elements are disposed in the upper side of the screen and button elements are disposed in the lower side of the screen. An identifying symbol (e.g., LP01) and an element type (e.g., the lamp) are allocated to each of these sections. A blank section at the right end of the screen is a special section in which button switching button elements are to be disposed. The button elements constitute a portion corresponding to a menu of the operating panel, and the button elements are commonly displayed in the standard screen.

The screen definition table setting unit 110 in FIG. 2 reads the screen definition table 111a for the standard screen stored in the area 36b of the RAM 36 in FIG. 1, and displays the data in a table form in the display 34. An attribute value of each element of the screen definition table 111a is undefined in an initial state.

FIG. 4 is an explanatory view showing a screen definition table for the screen switching button elements common to the standard screen. The screen definition table setting unit 110 inputs a set value from the keyboard 35 into each of parameters such as a name of a button to be displayed and a name of a switching destination screen to which switching is to be performed, in the screen definition table in FIG. 4.

FIG. 5A is an explanatory view showing a screen definition table for the lamp elements of the individual operation screen in FIG. 3, and FIG. 5B is an explanatory view showing a screen definition table for the button elements of the individual operation screen. FIG. 5C is an explanatory view showing a screen definition table for PLC addresses in FIG. 5B. As shown in FIG. 5A, FIG. 5B and FIG. 5C, the screen definition table is constituted by a plurality of table parts set for respective elements. Symbols in the screen definition table correspond to the sections (e.g., LP01, and BT1) set in the model screen data for the standard screen shown in FIG. 3.

The screen definition table setting unit 110 inputs a set value from the keyboard 35 into each of parameters such as a name of a lamp to be displayed in each section, a character size of the name, a color of the lamp when the lamp is ON, and a color of the lamp when the lamp is OFF, in the screen definition table in FIG. 5A. For example, with regard to the parameter of the color, the set value is input in accordance with a rule in which, for example, white is indicated by W, black is indicated by BL, and orange is indicated by O.

Subsequently, the screen definition table for the button elements in FIG. 5B is set. The screen definition table setting unit 110 inputs a set value from the keyboard 35 into each of parameters such as a name of a button to be displayed in each section, the number of lines of characters of the name, a character scaling factor, a color of the button when the button is ON, a color of the button when the button is OFF, a frame color of the button when the button is ON, and a frame color of the button when the button is OFF, in the screen definition table in FIG. 5B.

Subsequently, the screen definition table for PLC addresses in FIG. 5C is set. The screen definition table setting unit 110 inputs an address in the PLC 10 from the keyboard 35 into each of parameters that are addresses in the PLC 10 for lamp blinking of a button to be displayed in each section, lamp lighting of the button, an output of the button, an operation condition, and the like, in the screen definition table in FIG. 5C.

The screen data generating unit 120 in FIG. 2 combines the screen definition table 111a input by the screen definition table setting unit 110 with the model screen data 210a for the standard screen to generate screen data 120a, and displays this screen in the display 34.

Figure 6:
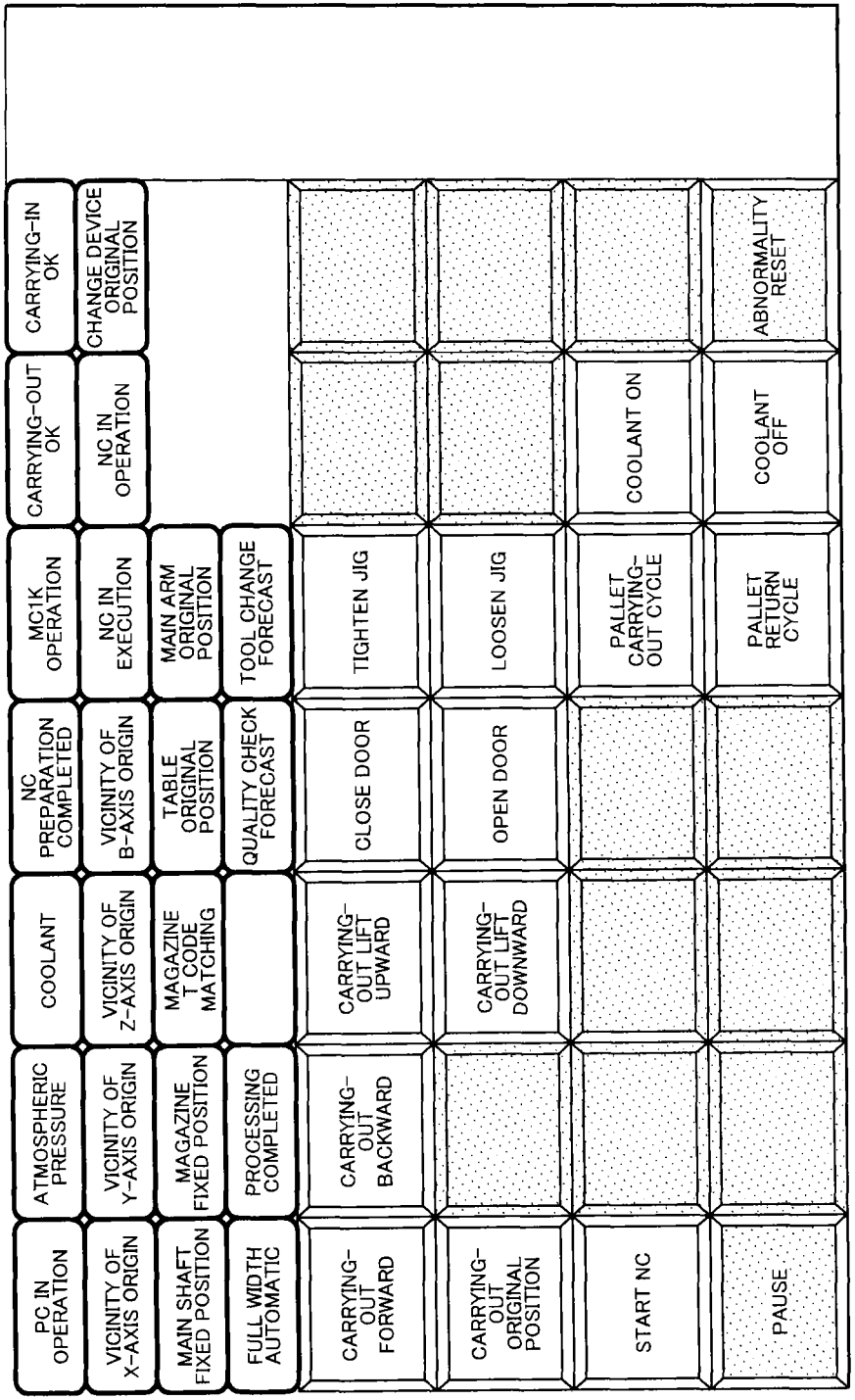
FIG. 6 is an explanatory view showing the individual operation screen that is displayed.

When the screen, which is set in accordance with the screen definition table 111a in FIG. 5A, FIG. 5B and FIG. 5C for the model screen data 210a for the individual operation screen of the standard screen in FIG. 3, is displayed in the display 34, the screen is displayed as shown in FIG. 6.

Next, in the screen definition processing 100 in FIG. 2, the model screen data 210b for the user screen stored in the area 36a of the RAM 36 in FIG. 1 is read. The user screen is, for example, a screen for exclusive use in equipment, which is designed by an equipment user. The screen definition device 30 includes the model screen data 210b corresponding to the user screen, and the screen definition table 111b corresponding to the model screen data 210b.

Figure 7:
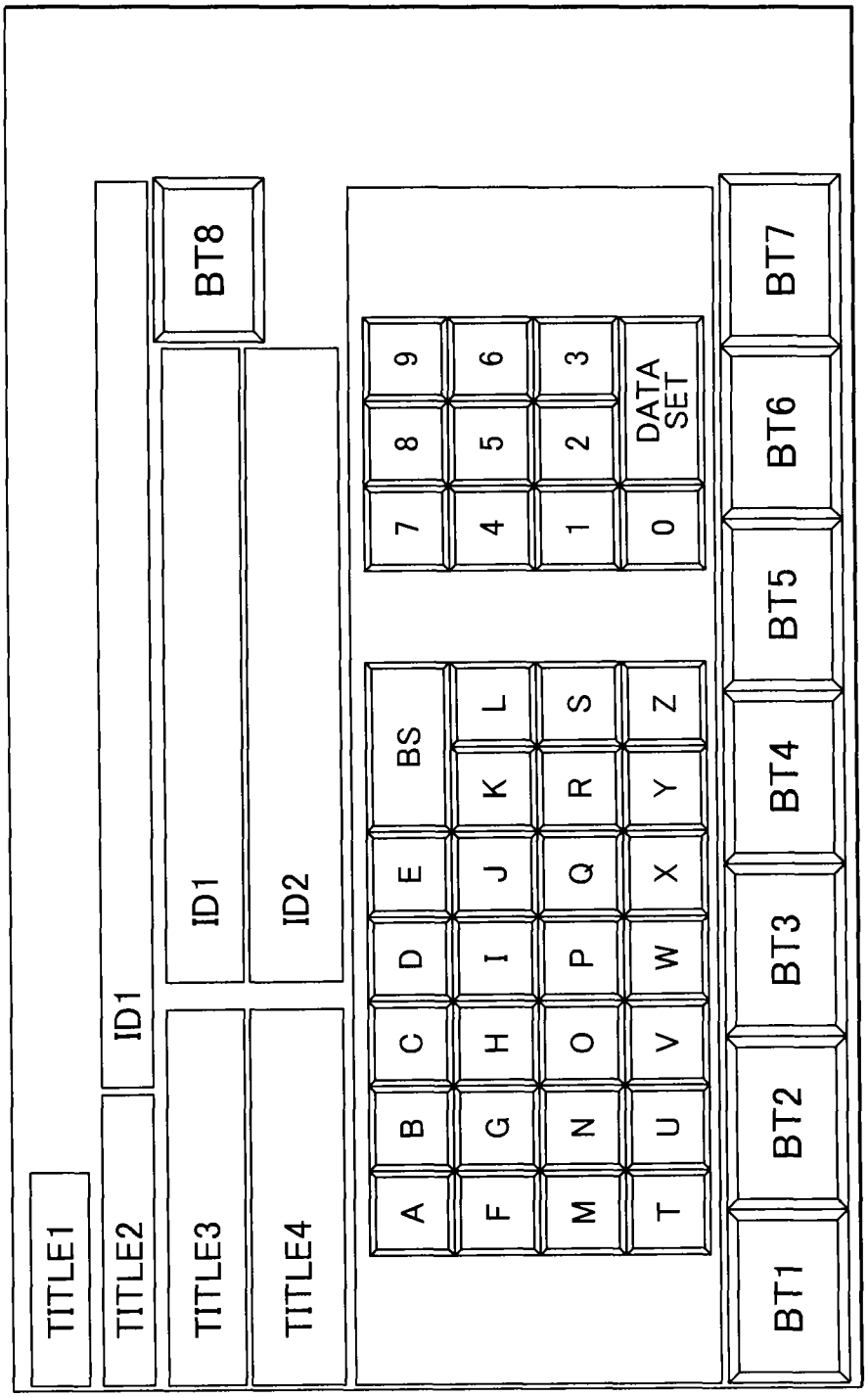
FIG. 7 is an explanatory view showing model screen data for an ID operation screen that is a user screen.

As shown in FIG. 7, the model screen data 210b is image data that has section information indicating an arrangement of elements constituting the screen. FIG. 7 shows the model screen data for an ID operation screen of the user screen. The ID operation screen has a section configuration in which ID elements are disposed in the upper side of the screen, and soft keyboard elements and button elements for setting IDs are disposed in the lower side of the screen. A blank section at the right end of the screen is a special section which is disposed in the same manner as in the standard screen and in which screen switching button elements are disposed.

FIG. 8 is an explanatory view showing a screen definition table for the ID operation screen in FIG. 7. As shown in FIG. 8, the screen definition table is constituted by a plurality of table parts set for respective elements. Symbols in the screen definition table correspond to sections (e.g., BT1) set in the model screen data for the user screen shown in FIG. 7.

The screen definition table setting unit 110 inputs a set value from the keyboard 35 into each of parameters such as a name of an item to be displayed in each section, a lamp color, an address where ID data is stored, and a name of a button, in the screen definition table in FIG. 8.

Furthermore, a screen definition table (not shown) for the screen switching button elements of the user screen is set. The screen definition table is the same as the screen definition table in FIG. 4 except that the screen definition table corresponds to the user screen. By setting the screen definition table in the same manner as the manner in which the screen definition table in FIG. 4 is set, the common screen switching buttons are displayed in the standard screen and the user screen.

The screen data generating unit 120 in FIG. 2 combines the screen definition table 111b input by the screen definition table setting unit 110 with the model screen data 210b for the user screen to generate screen data 120b, and displays the screen in the display 34.

Figure 9:
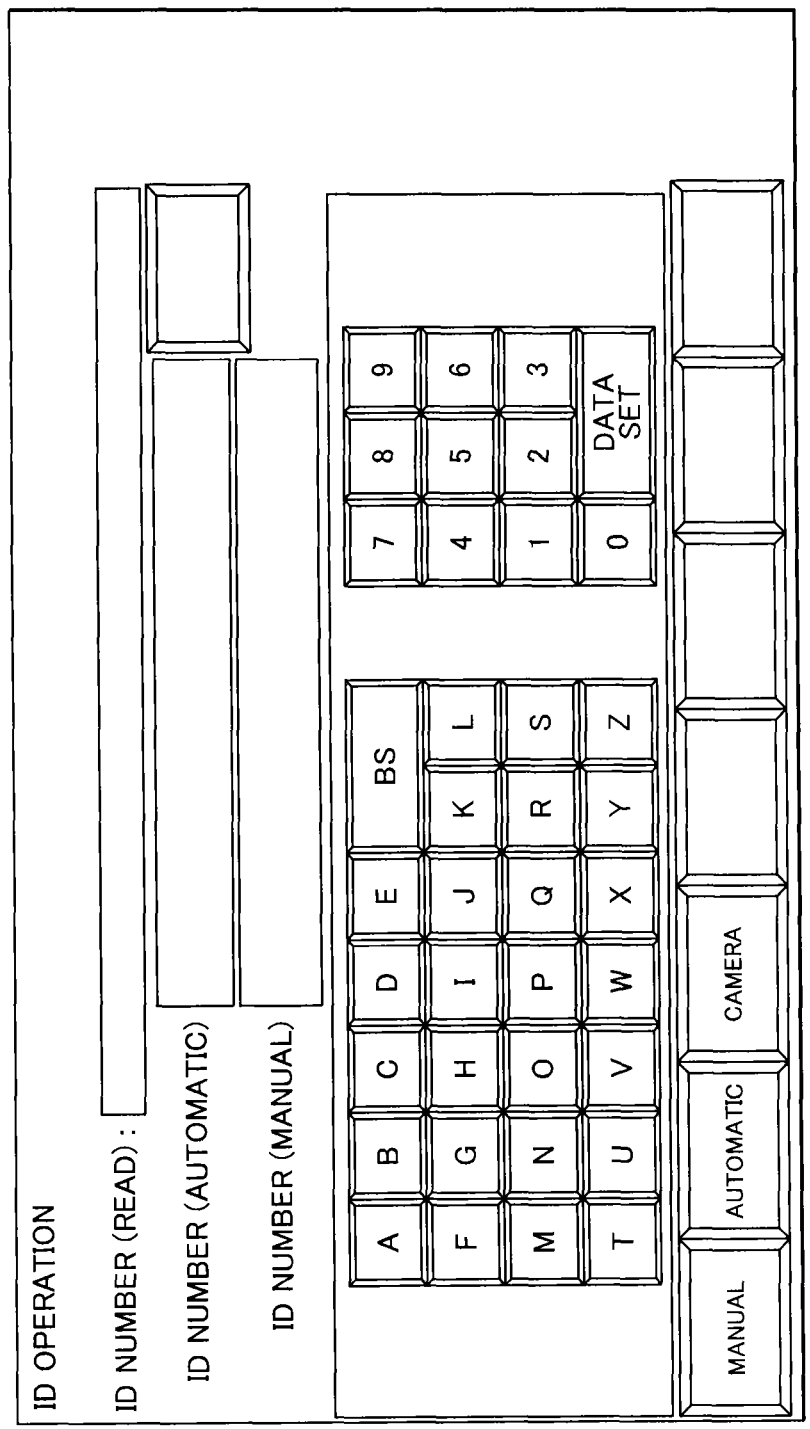
FIG. 9 is an explanatory view showing the ID operation screen that is displayed.

When the screen, which is set in accordance with the screen definition table in FIG. 8 for the model screen data 210b for the ID operation screen that is the user screen in FIG. 7, is displayed in the display 34, the screen is displayed as shown in FIG. 9. At this time, a screen name of the standard screen is set as a parameter for each screen switching button at the right end of the screen, and hence a reference relation indicated by link information has not been directly defined yet.

As described above, all the screen data 120a, 120b including the screen data for the standard screen and the user screen are generated by the screen data generating unit 120. Furthermore, the reference relation indicated by the link information of the screen data 120a and the link information of the screen data 120b is directly defined by the screen data combining unit 130. Furthermore, screen data management information is generated, and thus, the format of the data is converted into a data format that can be handled by the operating panel 20. The screen data and the screen data management information are stored in the area 36e and the area 36f of the RAM 36 in FIG. 1, respectively.

When the data stored in the RAM 36 is output to the memory card and the memory card is set in the memory card device 28 of the operating panel 20, the data of the memory card is input to the operating panel 20, and is stored in the RAM 24. Thus, the screen definition processing for the operating panel 20 is completed.

As described above, in the screen definition device 30, the screen data 120a, 120b can be efficiently created by easily defining all the screens including the standard screen and the user screen in the table form. Furthermore, the user screen defined by the screen definition device 30 can be added to the existing standard screen.

As shown in FIG. 2, a screen definition device 30 according to another embodiment may include a screen definition table acquiring unit 140 that is able to acquire a corresponding screen definition table 111b from existing screen data 120c. Thus, the screen definition table 111b can be acquired even from the screen data 120c for a user screen, which has been defined by drawing software 200, and the screen definition table 111b can be easily changed by a screen definition table setting unit 110. Furthermore, a screen data generating unit 120 regenerates the screen data 120c, and thus, the screen data can be efficiently created by using the existing screen data.

What is claimed is:

1. An operating panel connected to a programmable controller of operating equipment, comprising:
    screen data corresponding to a screen constituted by elements including a lamp indicating an operating state of a controller that controls equipment, and a button for operating the controller;
    a screen display unit in which the screen is displayed in a display in accordance with the screen data;
    a transparent touch panel disposed to overlap with the display, wherein when the touch panel is touched in the operating panel, an operation corresponding to the screen displayed in the display is performed, and the screen data includes section information indicating an arrangement of the elements constituting the screen, a screen definition table in which parameters for the elements constituting the screen are set, and link information that refers to other screen data for exclusive use in the equipment and which is designed by an equipment user; and
    a screen definition device comprising:
        a screen definition table setting unit that sets the screen definition table in a table form that correlates a plurality of parameters to an entry;
        a screen data generating unit that outputs the screen data generated by combining model screen data in which the section information is set, with the screen definition table for the model screen data;
        a screen definition table setting unit of the other screen data that sets the screen definition table of the other screen data in a table form; and
        a screen data combining unit that combines the screen data with the other screen data based on a reference relation indicated by link information of the screen data and link information of the other screen data.

2. The operating panel according to claim 1, further comprising:
    a screen definition table acquiring unit that acquires the screen definition table from the screen data.

* * * * *